(12) United States Patent
Kaihoko et al.

(10) Patent No.: US 7,768,600 B2
(45) Date of Patent: Aug. 3, 2010

(54) OPTICAL FILTER, AND LIQUID-CRYSTAL DISPLAY DEVICE COMPRISING IT

(75) Inventors: Hiroyuki Kaihoko, Minami-ashigara (JP); Ryuji Saneto, Minami-ashigara (JP); Yukito Saitoh, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 349 days.

(21) Appl. No.: 12/073,539

(22) Filed: Mar. 6, 2008

(65) Prior Publication Data

US 2008/0266691 A1     Oct. 30, 2008

(30) Foreign Application Priority Data

| | | |
|---|---|---|
| Mar. 7, 2007 | (JP) | ............................. 2007-056925 |
| Feb. 19, 2008 | (JP) | ............................. 2008-037119 |
| Mar. 3, 2008 | (JP) | ............................. 2008-052542 |

(51) Int. Cl.
*G02F 1/1335*     (2006.01)
*G02B 5/22*       (2006.01)

(52) U.S. Cl. ...................... 349/106; 349/107; 359/891

(58) Field of Classification Search ................. 349/106, 349/107; 359/891
See application file for complete search history.

(56) References Cited

U.S. PATENT DOCUMENTS

| | | | | |
|---|---|---|---|---|
| 5,262,893 A | * | 11/1993 | Shrauger et al. | ............. 359/565 |
| 6,751,023 B2 | * | 6/2004 | Umemoto et al. | ........... 359/599 |
| 6,780,575 B2 | * | 8/2004 | Szajewski | ................... 430/503 |
| 2002/0080308 A1 | * | 6/2002 | Umemoto et al. | ............. 349/96 |

FOREIGN PATENT DOCUMENTS

JP     2005-234524 A     9/2005

* cited by examiner

*Primary Examiner*—Mike Qi
(74) *Attorney, Agent, or Firm*—Buchanan Ingersoll & Rooney PC

(57) ABSTRACT

Provided is an optical filter having a light-transmitting region of transmitting light having a predetermined wavelength and a light-blocking region disposed adjacent to the light-transmitting region to block out the light, wherein the light-blocking region has an optical density gradation relative to light in the normal direction, from the contact point to the light-transmitting region along an in-plane direction, and the optical density is the smallest at the contact point to the light-transmitting region.

8 Claims, 4 Drawing Sheets

OPTICAL FILTER, AND LIQUID-CRYSTAL DISPLAY DEVICE COMPRISING IT

CROSS-REFERENCE TO RELATED APPLICATIONS

This application claims benefit of priority under 35 U.S.C. 119 to Japanese Patent Application Nos. 2007-056925 filed on Mar. 7, 2007, 2008-37119 filed on Feb. 19, 2008, and 2008-052542 filed on Mar. 3, 2008; and the entire contents of the applications are incorporated herein by reference.

BACKGROUND OF THE INVENTION

1. Field of the Invention

The present invention relates to an optical filter such as a color filter, and to a liquid-crystal display device comprising it.

2. Related Art

An optical filter is a member having a function of absorbing light having a specific wavelength and transmitting light having a wavelength except it, and is used in various optical devices such as display devices. For example, in a full-color liquid-crystal display device, a color filter is used for displaying a color image by combination of light of three primary colors of red, blue and green. Many optical filters such as color filters are so constituted as to have a light-transmitting region of transmitting light having a predetermined wavelength and a light-blocking shielding region of blocking out such light as disposed in a predetermined pattern. In the thus-constituted optical filter, light may be diffracted or scatter at the boundary between the light-blocking region and the light-transmitting region, therefore causing a problem in that the filter performance is thereby worsened. For solving the problem, for example, proposed is a technique of obliquely crossing the corners of rectangular pixel regions (JPA No. 2005-234524).

SUMMARY OF THE INVENTION

The present invention is to provide an optical filter in which the light diffraction phenomenon to occur in the boundary between the light-blocking region and the light-transmitting region is prevented.

The invention is also to provide a liquid-crystal display device of which the display performance degradation to be caused by the diffracted light through the color filter therein is reduced.

In one aspect, the present invention provides an optical filter comprising a light-transmitting region of transmitting light having a predetermined wavelength and a light-blocking region disposed adjacent to the light-transmitting region to block the light, wherein the light-blocking region has an optical density gradation relative to light in the normal direction, from the contact point to the light-transmitting region along an in-plane direction, and the optical density is the smallest at the contact point to the light-transmitting region.

The optical density gradation relative to light in the normal direction may increase continuously or discontinuously from the contact point to the light-transmitting region in the in-plane direction.

In one embodiment, the optical density gradation relative to light in the normal direction may be based on the gradation of the thickness of the light-blocking region. In the embodiment, the thickness of the light-blocking region may increase continuously or discontinuously from the contact point to the light-transmitting region, in the in-plane direction.

In one embodiment, at least a part of the contact face of the light-blocking region to the light-transmitting region may have a waved profile with a pitch shorter than the wavelength of the incident light given in use.

In some embodiments, the light-blocking region may be a black matrix or an electrode.

One embodiment of the optical filter is a color filter.

In another aspect, the present invention provides a liquid-crystal display device comprising at least a liquid crystal display cell, a polarizer and an optical filter of the invention.

Figure 1A:
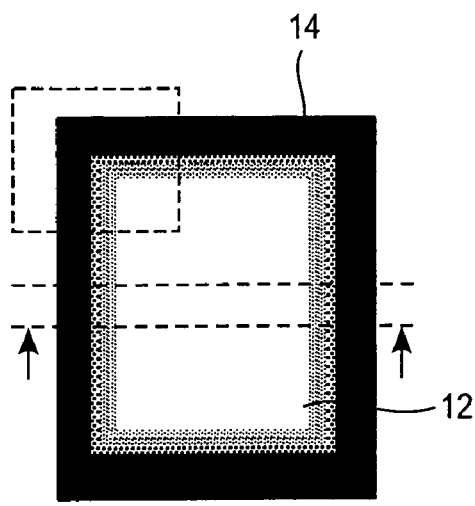
FIG. 1A is a top view of one example of an optical filter of the invention.

In the drawings, the numerical references and the signs have the following means.
12 Light-transmitting Region
14, 14', 14", 14''' Light-blocking Region
z Normal Direction
x, y In-Plane Direction of Optical Filter
101, 103, 109, 111 Protective Film
102, 110 Polarizer
104, 108 Optically Anisotropic Layer
105, 107 Substrate use for Liquid crystal display cell
106 Liquid Crystal Layer
LC Liquid crystal display cell
PL1, Pl2 Polarizing Plate

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

Figure 1B:
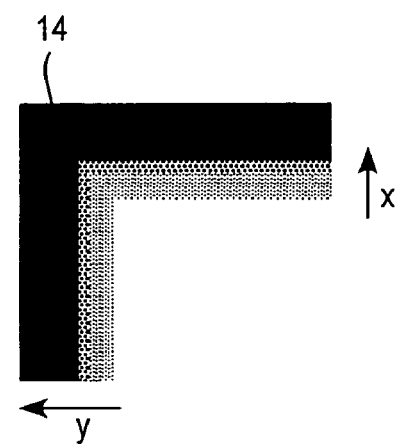
FIG. 1B is an enlarged view of a part of FIG. 1A.
Figure 1C:
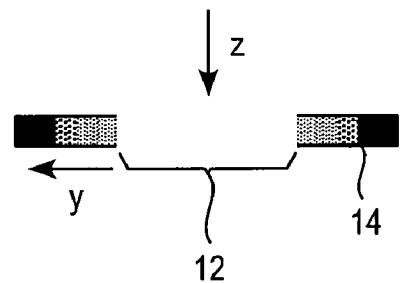
FIG. 1C is a side view of a part of FIG. 1A.

FIG. 1A is a plan view of one example of an optical filter of the invention in the normal direction thereof. FIG. 1B is an enlarged view of the part surrounded by the dotted line in FIG. 1A; and FIG. 1C is a side view of a part of the optical filter, cut along the two dotted lines in FIG. 1A and taken in the direction of the arrow in the drawing. In FIG. 1A to FIG. 1C, the optical density of the light-blocking region 14 and the light-transmitting region 12 is graphically shown as shading relative to the light coming in the normal direction (the direction of the arrow z in FIG. 1C); and it is noted that this does not always correctly reflect the actual color and configuration of the color filter.

The color filter 10 of FIG. 1 comprises a light-transmitting region 12 and a light-blocking region 14 adjacent to the light-transmitting region 12 to be around it. Shown as the shading in FIG. 1A to FIG. 1C, the light-blocking region 14 has an optical density gradation relative to the light coming in the normal direction (arrow z). The optical density of the light-blocking region 14 is the lowest in the contact face to the light-transmitting region 12, and this increases in the in-plane direction, for example, in the direction of the arrows x and y in FIG. 1B. The optical density increase may be continuous, or may be discontinuous for intermittent increase.

When a conventional optical filter such as color filter is observed, as put between a pair of polarizers in cross-Nicol configuration, light leakage often occurs in the boundary between the light-transmitting region and the light-blocking region. This may be because, when polarized light comes in the optical filter, then it may be diffracted in the boundary between the light-transmitting region and the light-blocking region, and the diffracted light is shifted from the polarization axis, therefore causing the light leakage. In the invention, an optical density gradation is formed relative to the light in the normal direction in the light-blocking region, thereby preventing the diffraction phenomenon and reducing the light leakage.

Figure 2:
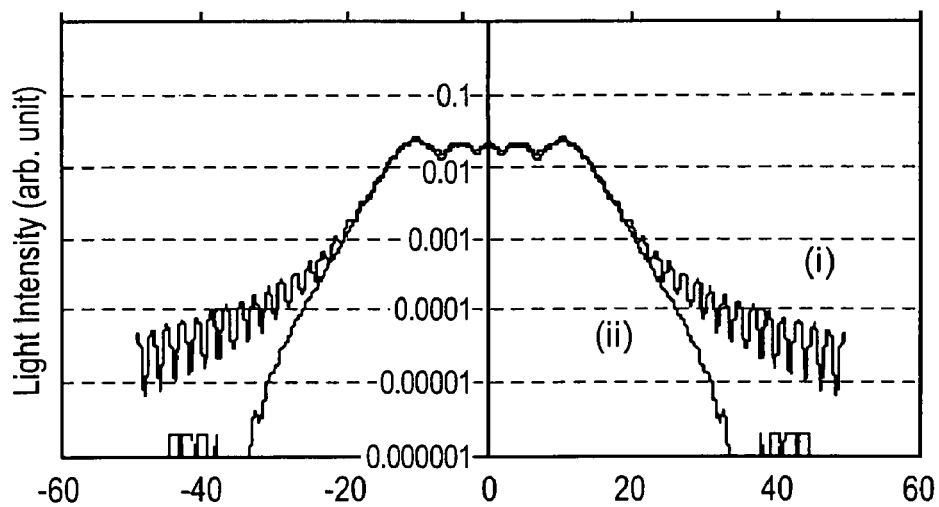
FIG. 2 is a graph showing the calculated result of the diffracted light intensity through a conventional optical filter (i) not having an optical density gradation in the light-blocking region, and through an optical filter of the invention (ii) having an optical density gradation in the light-blocking region.

FIG. 2 is a graph showing the calculated result of the diffracted light intensity through a conventional optical filter (i) not having an optical density gradation in the light-blocking region, and through an optical filter of the invention (ii) having an optical density gradation in the light-blocking region. The diffracted light intensity may be calculated, based on Fresnel-Kirchhoff diffraction integral described in, for example, Applied Physical Engineering Selection, Applied Optics I (by Tadao Tsuruta, Baifu-kan), p. 165.

When polarized light is given to the optical filter (i) not having an optical density gradation in the light-blocking region, in the normal direction, then a light intensity in some degree is observed by the above-mentioned diffraction phenomenon in the part over the width of the light-transmitting region, as shown by the curve (i) in FIG. 2. On the other hand, when the optical filter (ii) of the invention having an optical density gradation is observed in the same manner, then the light intensity become nearly 0 in the part over the width of the light-transmitting region, as shown by the curve (ii) in FIG. 2; and this means that the optical filter (ii) inhibits the light leakage to be caused by the diffraction phenomenon.

The optical density in the light-blocking region may be measured with a densitometer; and the presence or absence of the optical density gradation may be confirmed by the density change.

The method of forming the optical density gradation in the light-blocking region is not specifically defined. The optical density gradation may be formed, mainly depending on the shape of the light-blocking region or on the material of the light-blocking region, to which, however, the invention should not be limited.

Figure 3A:
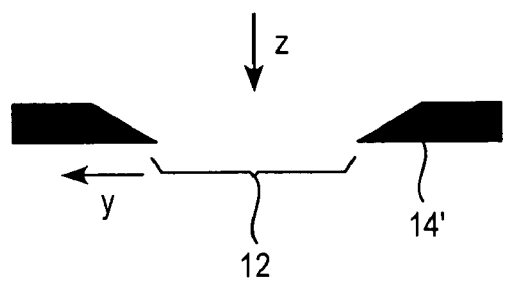
FIG. 3A and FIG. 3B each are a side view of a part of an example of an optical filter of the invention.
Figure 3B:
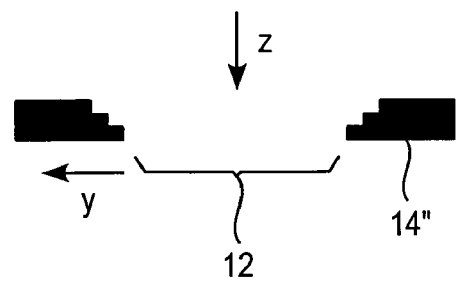

According to the former method, an optical density gradation based on a thickness gradation of the light-blocking region can be formed. FIG. 3 shows examples of an optical filter in which the optical density gradation is based on the thickness gradation of the light-blocking region. FIG. 3A and FIG. 3B each are a side view of a part cut by two dotted lines, like FIG. 1C. In FIG. 3A, the thickness of the light-blocking region 14' is the smallest at the contact point to the light-transmitting region 12, and continuously increases in the in-plane direction of the arrow y. In FIG. 3B, the thickness of the light-blocking region 14" is the smallest at the contact point to the light-transmitting region 12, and discontinuously and intermittently increases in the in-plane direction of the arrow y. As a result, the optical density relative to the incident light in the normal direction (arrow z) is the smallest at the contact point to the light-transmitting region 12 and increases in the direction of the arrow y, as shown in FIG. 1C.

FIG. 4 shows other examples of an optical filter in which the optical density gradation is based on the profile of the light-blocking region. FIG. 4A is an enlarged view of a part surrounded by dotted lines, like FIG. 1B. In the optical filter of FIG. 4A, the contact face between the light-blocking region 14''' and the light-transmitting region 12 is waved. The wave has a wave pitch shorter than the wavelength of the incident light to be given to the optical filter in practical use. Since the wave pitch of the contact face of the light-blocking region 14''' is shorter than the wavelength of the incident light, the mean area to be irradiated with the light in the normal direction of the light-blocking region 14''' is the smallest at the contact point to the light-transmitting region 12, and increases in the in-plane direction of the arrows x and y. As a result, the optical density relative to the light in the normal direction (arrow z) of the light-blocking region 14''' increases in the same direction (arrows x, y). In this embodiment, the profile of the light-blocking region 14''' in the thickness direction is not specifically defined; and for example, the thickness may be uniform as in FIG. 4B, or may vary as in FIG. 4C or FIG. 4D. The form of the contact face is not limited to the waveform, but may be any others in which the area decreases in the direction of the light-transmitting region 12, for example, it may have a form of triangle repetition.

According to the latter method, a optical density gradation based on a concentration gradation of a light-absorbing compound in the light-blocking region can be formed. More concretely, in forming the light-blocking region, for example, a black colorant may be used; and it is desirable that the concentration of the black colorant is made lowest at the contact point to the light-transmitting region, and that the concentration is increased in the direction of the arrows x and y in FIG. 1C. For forming the region having a concentration gradation of the light-absorbing compound therein, for example, in an inkjet system, employable is a method of controlling the jetting amount or changing the jetting frequency. Examples of the usable black colorant are described below.

In the above, only one light-transmitting region is shown in the drawings for simplifying the explanation thereof, but in general, an optical filter has a structure of plural light-transmitting regions configured as matrices, in which a light-blocking region is disposed between the individual light-transmitting regions. One embodiment of the optical filter of the invention is a color filter. In one embodiment of the color filter, RGB-transmitting regions that are colored in RGB and transmit only R light, G light and B light are configured as matrices of light-transmitting regions, and a black matrix of a light-blocking region is formed around the individual light-transmitting regions. In the embodiment of the color filter, each RGB-transmitting region is generally rectangular, and its major side is from 100 to 500 μm or so and its minor side is from 30 to 200 μm or so. In general, the RGB-transmitting regions are regularly disposed at intervals of from 30 to 50 μm or so, and in those intervals, formed is the light-blocking region of a black matrix. The thickness of the black matrix is generally from 0.5 to 2 μm or so. In the embodiment of the color filter, the optical density gradation preferably continues for a length of from 1 to 10 μm or so, more preferably for a length of from 3 to 6 μm or so. In case where the optical density gradation is formed by the thickness gradation of a black matrix as in FIG. 3A and FIG. 3B, it is desirable that the thickness of the black matrix is made as small as possible at the contact point to the light-transmitting region, and the thickness is increased up to the above range. In case where the black matrix face is waved as in FIG. 4, it is desirable that the wave pitch is shorter than the wavelength of visible light.

For producing the microstructures of FIGS. 3 and 4, a technique of photolithography using a patterning mask may be employed.

Various materials and methods usable for producing the optical filter of the invention are described in detail hereinunder.

The light-blocking region of the optical filter of the invention may be formed of a black photosensitive resin composition. The black photosensitive resin composition may be, for example, a photosensitive resin composition containing at least (A) at least one black colorant, (B) a resin soluble in developer, and (C) a photopolymerizing material.

(A) Black Colorant:

Pigment:

As the black colorant in the invention, preferably used is at least one pigment. Pigment is generally grouped into an organic pigment and an inorganic pigment. Examples of the pigment favorably used in the invention are colorant described in JPA No. 2005-17716, paragraphs [0038] to [0040]; pigments described in JPA No. 2005-361447, paragraphs [0068] to [0072]; and colorants described in JPA No. 2005-17521, paragraphs [0080] to [0088].

Of the above-mentioned pigments, preferred are carbon black, titanium black and graphite. Above all, in the invention, it is desirable that at least one colorant is carbon black from the viewpoint of the light shieldability and the cost thereof.

As examples of carbon black, preferred is Pigment Black 7 (carbon black C.I. No. 77266). Commercial products usable herein are Mitsubishi Carbon Black MA100 (by Mitsubishi Chemical) and Mitsubishi Carbon Black #5 (by Mitsubishi Chemical).

As examples of titanium black, preferred are $TiO_2$, TiO, TiN and their mixtures. Commercial products usable herein are Mitsubishi Materials' 12S and 13M (trade names). Preferably, the mean particle size of titanium black for use herein is from 40 to 100 nm.

As examples of graphite, preferred are those having a particle size, as Stokes diameter, of at most 3 μm. Using graphite of at most 3 μm in size gives a light-blocking pattern having a uniform outline profile and therefore giving an image of good sharpness. Preferably, the existence ratio of the particles having a particle size of at most 0.1 μ is at least 70%.

In case where the pigment is used, as combined with metallic particles mentioned below, it is desirable that their color hue is in a complementary relationship. One or more different types of pigments may be used either singly or as combined. Preferred pigment combinations are a combination of a pigment mixture of red and blue pigments that are complementary to each other, and a pigment mixture of yellow and violet pigments that are complementary to each other; a combination of the above mixtures and a black pigment added thereto; and a combination of blue, violet and black pigments.

The sphere-corresponding diameter of the pigment is preferably from 5 nm to 5 μm, more preferably from 10 nm to 1 μm; but is it preferably from 20 nm to 0.5 μm for color filters.

Metal Particles, and Metal-Containing Particles:

As at least one of the above-mentioned black colorants, also preferred is use of metal particles or metal-containing particles (hereinafter these may be referred to as "metallic particles"). Using it may produce a thin and high-density light-blocking film for display devices.

Not specifically defined, the metal particles and the metal for the metal-containing particles may be any ones. The metal particles may be a combination of two or more metals, or may be alloy particles. The metal-containing particles may be any metal compound particles having at least one metal, and may be composite particles of a metal and a metal compound.

Preferably, the metal particles contain, as the main ingredient thereof (in an amount of at least 60% by mass), a metal selected from a group of Period 4, Period 5 and Period 6 of the Long Periodic Table (IUPAC 1991). Also preferably, they contain a metal selected from Group 2 to Group 14, more preferably from Group 2, Group 8, Group 9, Group 10, Group 11, Group 12, Group 13 and Group 14. Of those metals, more preferred for the metal particles are metals of Period 4, Period 5 or Period 6 and that are in Group 2, Group 10, Group 11, Group 12 or Group 14.

Preferred examples of the metal that constitute the metal particles are at least one selected from copper, silver, gold, platinum, palladium, nickel, tin, cobalt, rhodium, iridium, iron, calcium, ruthenium, osmium, manganese, molybdenum, tungsten, niobium, tantalum, titanium, bismuth, antimony, lead and their alloys. More preferred metals are at least one selected from copper, silver, gold, platinum, palladium, nickel, tin, cobalt, rhodium, calcium, iridium, and their alloys; and even more preferred metals are at least one selected from copper, silver, gold, platinum, palladium, tin, calcium and their alloys. Still more preferred metals are at least one selected from copper, silver, gold, platinum, tin and their alloys. Especially preferred are silver and its alloys (as silver, preferred is colloidal silver); and most preferred are particles having a silver/tin alloy moiety. The particles having a silver/tin alloy moiety are described below.

Metal Compound Particles:

"Metal compound" is a compound of the above metal and any other element than the metal. The compound of a metal and other element includes metal oxides, sulfides, sulfates and carbonates, and their particles are preferred as the metal compound particles. Above all, especially preferred are sulfide particles in view of the color tone and the formability into fine particles.

Examples of the metal compound include copper (II) oxide, iron sulfide, silver sulfide, copper(II) sulfide, titanium black. From the viewpoint of the color tone and the formability into fine particles, silver sulfide is especially preferred.

Composite Particles:

A composite particle is formed by a metal and a metal compound bonding together to constitute one particle. For example, it includes a particle where the composition of the inside of the particle differs from that of the surface thereof; and a particle formed through integration of two different types of particles. One or more different types of the metal and/or the metal compound may constitute the composite particle.

Preferred examples of the composite particle of a metal compound and a metal are composite particles of silver and silver sulfide, and composite particles of silver and copper(II) oxide.

The metal particles for use in the invention may be core/shell type composite particles (core/shell particles). The core/shell type composite particles (core/shell particles) are those prepared by coating the surface of a core material with a shell material; and as their examples, mentioned are the core/shell particles described in JPA No. 2006-18210, paragraphs [0024] to [0027].

Particles with Silver/Tin Alloy Moiety:

At least one type of the above metallic particles is preferably particles having a silver/tin alloy moiety. The particles having a silver/tin alloy moiety include those formed of a silver/tin alloy, those composed of a silver/tin alloy moiety and other metal part; and those composed of a silver/tin alloy moiety and other metal part.

The particle having a silver/tin metal moiety, which comprises a silver/tin alloy in at least a part thereof, may be confirmed, for example, by spectrometry in an area of 15 nm square around the center of each particle under an accelerating voltage of 200 kV, using Hitachi's HD-2300 and Noran's EDS (energy dispersion X-ray spectrometer).

The particles having a silver/tin alloy moiety have a high black density, and even when a small amount of them is used or even when a thin film of them is formed, they may exhibit an excellent light-blocking performance and may have high thermal stability; and therefore, they may be thermally processed at high temperatures (for example, 200° C. or higher) not detracting from their black density, and may stably ensure their high-level light-shieldability. For example, they are favorable for light-blocking films (as black matrix) for color filters that require high-level light shieldability and are generally subjected to baking treatment.

Preferably, the particles having a silver/tin alloy moiety are prepared by compounding (alloying) silver (Ag) and tin (Sn) in a ratio of silver (Ag) to tin (Sn) of from 30 to 80 mol %. The Ag ratio falling within the above range makes the particles have high thermal stability in a high-temperature range and makes them have a reduced light reflectance and have an increased black density. In particular, the particles having an Ag ratio of 75 mol %, or that is, the AgSn alloy particles of the type are favorable as they are easy to produce and are stable.

The particles having a silver/tin alloy moiety may be produced by an ordinary alloying method that comprises heating, melting and mixing the components in a crucible. However, the melting point of Ag is around 900° C., but the melting point of Sn is around 200° C., and the two differ greatly, and in addition, the method requires an additional step of grinding the particles into fine particles after the compounding (for example, alloying) step. Accordingly, it is desirable that the particles are produced by a particle reduction method. This comprises mixing an Ag compound and an Sn compound and reducing the mixture; and in this method, a metal Ag and a metal Sn may be deposited at the same time in a position near to them, and therefore, compounding (for example, alloying) and particle deposition may be attained at the same time. Ag is readily reduced and may deposit prior to Sn, and therefore, it is desirable that Ag and/or Sn are formed as a complex and their deposition timing is well controlled.

The Ag compound is preferably silver nitrate ($AgNO_3$), silver acetate (Ag ($CH_3COO$)), silver perchlorate ($AgClO_4.H_2O$). Above all, especially preferred is silver acetate. The Sn compound is preferably stannous chloride ($SnCl_2$), stannic chloride ($SnCl_4$), stannous acetate (Sn($CH_3COO$)$_2$). Above all, especially preferred is stannous acetate.

For the reduction, preferably employed is a method of using a reducing agent, or a method of electrolytic reduction. In particular, the former method of using a reducing agent is preferred, as giving fine particles. The reducing agent includes CTAB, ascorbic acid, hydroquinone, catechol, paraminophenol, paraphenylenediamine, hydroxyacetone. Above all, especially preferred is hydroxyacetone as it may readily vaporize away and may hardly have a negative influence on display devices.

The metallic particles may be commercial products, or may be prepared according to a metal ion chemical reduction method, an electroless plating method, or a metal vapor evaporation method.

For example, rod-shaped silver particles may be produced by adding a silver salt to spherical silver particles serving as seed particles, followed by reduction with a reducing agent having a relatively weak reducing power such as ascorbic acid in the presence of a surfactant such as CTAB (cetyltrimethylammonium bromide). The method gives silver rods or wires. This is described in Advanced Materials, 2002, 14, 80-82. Similar descriptions are given in Materials Chemistry and Physics 2004, 84, 197-204, Advanced Functional Materials, 2004, 14, 183-189.

A method of electrolysis is described in Materials Letters 2001, 49, 91-95; and a method of irradiation with microwaves to produce silver rods is described in Journal of Materials Research 2004, 19, 469-473. An example of combined use of reversed micelles and ultrasonic waves is described in Journal of Physical Chemistry B 2003, 107, 3679-3683.

Gold particles are described in Journal of Physical Chemistry B1999, 103, 3073-3077; Langmuir 1999, 15, 701-709; and Journal of American Chemical Society 2002, 124, 14316-14317.

Rod-shaped particles may also be produced by modification (amount control, pH control) of the above-mentioned methods.

For making them more colorless, the metallic particles may be combined with various types of particles. For example, spherical or cubic particles may be combined with other tabular (hexagonal, triangular) or rod-shaped particles derived from them, thereby giving a higher transmission density. Using the metallic particles of those types may produce thin light-blocking layers.

Regarding the particle size distribution of the above-mentioned metallic particles, the particle distribution is processed into normal distribution approximation, and the particle size distribution width of the mean particle size, $D^{90}/D^{10}$, is preferably from 1.2 to less than 50. The particle size is a particle diameter corresponding to the length L of the major axis of each particle; and $D^{90}$ means a particle diameter of 90% of the particles near to a mean particle size; and $D^{10}$ means a particle diameter of 10% of the particles near to a mean particle size. From the viewpoint of the color tone, the particle size distribution width is preferably from 2 to 30, more preferably from 4 to 25. When the distribution width is less than 1.2, then the color tone may be near to monotone; but when it is 50 or more, then coarse particles may scatter and may produce turbidity.

Concretely, the particle size distribution width $D^{90}/D^{10}$ may be determined as follows: In a film, 100 metal particles are randomly measured according to a method of measuring three axial diameters mentioned below. The length of the major axis L is defined as the particle diameter, and the particle size distribution is processed into normal distribution approximation. The particle diameter of 90% by number of the particles that are near to the mean particle size is referred to as $D^{90}$; and the particle diameter of 10% by number of the particles is referred to as $D^{10}$; and $D^{90}/D^{10}$ can be thus computed.

As the metallic particles, preferred are metal particles, alloy-containing particles or metal compound particles; more preferred are silver particles, silver alloy-containing particles or silver compound particles; and most preferred are particles having a silver/tin alloy moiety.

Preferably, the number-average particle size of the metallic particles is at most 0.1 µm, more preferably at most 0.08 µm, even more preferably at most 0.05 µm. When the number-average particle size of the particles at most 0.1 μm, then it is advantageous in that the surface smoothness is good and fish eye failures caused by coarse grains may be reduced.

Preferably, the metallic particles exist while stably dispersed in the composition. For example, they are preferably in colloid. In the colloidal state, for example, it is desirable that the metallic particles are dispersed as substantially finely dispersed particles. "Substantially dispersed" as referred to herein means that the primary particles are individually independently dispersed, not aggregated or semi-aggregated.

Preferred examples of the dispersant for use in dispersion and other additives that may be in the composition of the invention are described in JPA No. 2005-17322, paragraphs [0027] to [0031].

The content of the black colorant to be in the photosensitive composition may be controlled to be from 10 to 90% by mass or so, preferably from 10 to 80% by mass relative to the mass of the formed light-blocking layer, in consideration of the additional post-baking step, if any, and for the purpose of preventing the metallic particles from fusing together. Preferably, the content of the black colorant is determined in consideration of the optical density change that depends on the mean particle size of the metallic particles and the pigment.

(B) Resin Soluble in Developer:

The photosensitive composition includes one developable with an aqueous alkali solution and the other developable with an organic solvent. From the viewpoint of the safety and the cost of the developer, preferred is the composition developable with an aqueous alkali solution. Accordingly, the resin soluble in the developer is selected from an alkali-soluble resin.

Examples of the alkali-soluble resin are resins having at least one group derived from an acid having pKa of at most 3.0. pKa of acid means an acid dissociation index in an aqueous infinite dilution solution at 25° C. For the pKa of acid, for example, referred to are the data described in Handbook of Chemistry, Basics, revised 3rd Ed., by the Chemical Society of Japan, Maruzen, June 1984, II-338.

The group derived from an acid having pKa of at most 3.0 includes a sulfonic acid group, a sulfuric acid group, a phosphoric acid group, a phosphonic acid group, and a phosphoramide group. Above all, from the viewpoint of evading chipping failures and improving the resin solubility in solvent, preferred is at least one selected from a phosphoric acid group, a phosphonic acid group and a phosphoramide group.

Preferably, the alkali-soluble resin comprises at least one repetitive unit obtained from a monomer of any of the following general formulae (I) to (III). More preferably, the alkali-soluble resin is a polymer produced by copolymerization of at least one monomer of any of the following general formulae (I) to (III), and at least one monomer having an acid group except phosphoric acid, phosphonic acid and phosphoramide groups.

<Monomers of Formulae (I) to (III)>

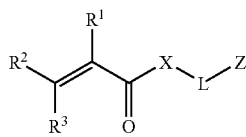

(I)

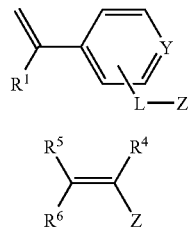

(II)

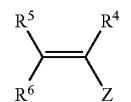

(III)

In these formulae, $R^1$, $R^2$ and $R^3$ each independently represent a hydrogen atom, a halogen atom (e.g., fluorine, chlorine, bromine), or an alkyl group having from 1 to 6 carbon atoms (e.g., methyl group, ethyl group, propyl group). Preferably, $R^1$, $R^2$ and $R^3$ each are a hydrogen atom or an alkyl group having from 1 to 3 carbon atoms, most preferably a hydrogen atom or a methyl group. Further preferably, $R^2$ and $R^3$ are hydrogen atoms.

X represents an oxygen atom (—O—) or an imino group (—NH—), preferably an oxygen atom.

L represents a single bond or a divalent linking group. The divalent linking group includes a divalent aliphatic group (e.g., alkylene group, substituted alkylene group, alkenylene group, substituted alkenylene group, alkynylene group, substituted alkynylene group), a divalent aromatic group (e.g., arylene group, substituted arylene group), a divalent heterocyclic group, and their combination with an oxygen atom (—O—), a sulfur atom (—S—), an imino group (—NH—), a substituted imino group (—NR—, in which R represents an aliphatic group, an aromatic group or a heterocyclic group), or a carbonyl group (—CO—).

The divalent aliphatic group may have a cyclic structure or a branched structure. Preferably, the aliphatic group has from 1 to 20 carbon atoms, more preferably from 1 to 15 carbon atoms, even more preferably from 1 to 10 carbon atoms. The aliphatic group is preferably a saturated aliphatic group rather than an unsaturated aliphatic group. The aliphatic group may have a substituent. Examples of the substituent include a halogen atom, a hydroxyl group, an aromatic group and a heterocyclic group.

The divalent aromatic group preferably has from 6 to 20 carbon atoms, more preferably from 6 to 15 carbon atoms, most preferably from 6 to 10-carbon atoms. The aromatic group may have a substituent. Examples of the substituent include a halogen atom, a hydroxyl group, an aliphatic group, an aromatic group and a heterocyclic group.

The divalent heterocyclic group preferably has a 5-membered ring or a 6-membered ring as the hetero ring. In this, the hetero ring may be condensed with any other hetero ring, an aliphatic ring or an aromatic ring. The heterocyclic group may have a substituent. Examples of the substituent include a halogen atom, a hydroxyl group, an oxo group (=O), a thioxo group (=S), an imino group (=NH), a substituted imino group (=N—R, in which R represents an aliphatic group, an aromatic group or a heterocyclic group), an aliphatic group, an aromatic group and a heterocyclic group.

In the invention, L is preferably a single bond, an alkylene group or a divalent linking group containing an oxyalkylene structure. The oxyalkylene structure is more preferably an oxyethylene structure or an oxypropylene structure. L may contain a polyoxyalkylene structure that comprises at least two repetitive oxyalkylene structures. The polyoxyalkylene structure is preferably a polyoxyethylene structure or a polyoxypropylene structure. The polyoxyethylene structure is represented by —(OCH$_2$CH$_2$)$_n$—, in which n is preferably an integer of at least 2, more preferably an integer of from 2 to 10.

Z represents a functional group having a phosphoric acid or phosphonic acid structure, and is preferably a phosphoric acid group, a phosphonic acid group or a phosphoramide group. Y represents a methine group or a nitrogen atom.

$R^4$, $R^5$ and $R^6$ each independently represent a hydrogen atom, a halogen atom (e.g., fluorine, chlorine, bromine), or an alkyl group having from 1 to 6 carbon atoms (e.g., methyl group, ethyl group, propyl group), Z or -L-Z. In this, L and Z have the same meanings as above. $R^4$, $R^5$ and $R^6$ are preferably a hydrogen atom or an alkyl group having from 1 to 3 carbon atoms, more preferably a hydrogen atom.

In the invention, the monomer of formula (I) is preferably a compound in which $R^1$, $R^2$ and $R^3$ are a hydrogen atom or a methyl group, L is an alkylene group or a divalent linking group containing an oxyalkylene structure, X is an oxygen atom or an imino group, Z is a phosphoric acid, a phosphonic acid or a phosphoramide. The monomer of formula (II) is preferably a compound where $R^1$, $R^2$ and $R^3$ are a hydrogen atom or a methyl group, L is an alkylene group, Z is a phosphoric acid, a phosphonic acid or a phosphoramide, and Y is a methine group. The monomer of formula (III) is preferably a compound where $R^4$, $R^5$ and $R^6$ is a hydrogen atom or a methyl group, L is single bond or an alkylene group, and Z is phosphoric acid, phosphonic acid or phosphoramide.

Typical examples of the compounds of formulae (I) to (III) are shown below.

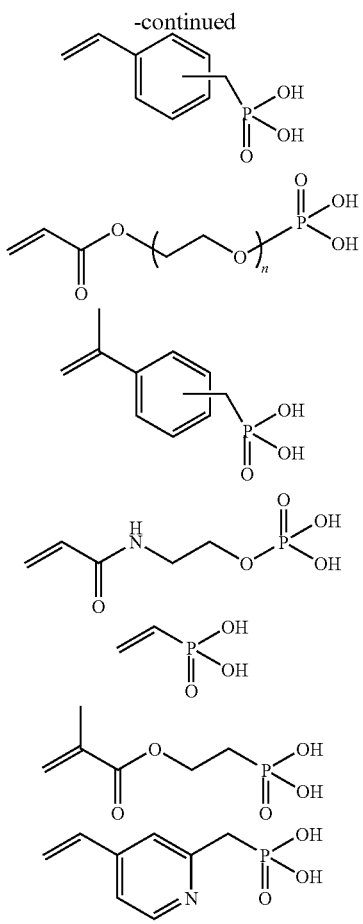

The content of the repetitive unit derived from the monomer of any of formulae (I) to (III) in the alkali-soluble resin is preferably from 0.05 to 30% by mass, more preferably from 0.1 to 20% by mass, even more preferably from 0.2 to 15% by mass, from the viewpoint of the adhesiveness of the photosensitive composition to a substrate and for preventing chipping failures.

The alkali-soluble resin preferably contains a repetitive unit derived from a monomer having an acid group except phosphoric acid, phosphonic acid and phosphoramide (hereinafter this is referred to as "monomer having an acid group").

The acid group includes a carboxylic acid group (carboxyl group), a sulfonic acid group and other active hydrogen-having group; and from the viewpoint of the solubility and the developability with alkali, preferred is a carboxyl group.

The monomer is a compound having an addition-polymerizing double bond in the molecule. The compound having both an addition-polymerizing double bond and an acid group includes acrylic acid, methacrylic acid, acrylic acid dimer, acrylic acid oligomer, a reaction product of a compound having an addition-polymerizing double bond and a hydroxyl group in the molecule (e.g., 2-hydroxyethyl methacrylate) and succinic anhydride, maleic acid, itaconic acid, fumaric acid, 4-vinylbenzoic acid. Above all, preferred is at least one selected from acrylic acid, methacrylic acid and 4-vinylbenzoic acid, from the viewpoint of the copolymerizability with other components.

The content of the repetitive unit derived from the acid group-having monomer in the alkali-soluble resin is preferably from 2 to 40% by mass, more preferably from 5 to 30% by mass, most preferably from 8 to 20% by mass for easy control of the alkali development time.

The alkali-soluble resin may contain at least one other addition-polymerizable monomer except the monomer of any of formulae (I) to (III) and the acid group-having monomer.

The other monomer may be suitably selected from monomers copolymerizable with the monomer of any of formulae (I) to (III) and the acid group-having monomer. Concretely, it includes vinyl cyanides (e.g., (meth)acrylonitrile, α-chloroacrylonitrile), vinyl carboxylates (e.g., vinyl acetate, vinyl formate), aliphatic conjugated dienes (e.g., 1,3-butadiene, isoprene), alkyl, aralkyl or aryl(meth)acrylates (e.g., methyl (meth)acrylate, ethyl (meth)acrylate, isopropyl(meth)acrylate, normal butyl (meth)acrylate, isobutyl(meth)acrylate, cyclohexyl (meth)acrylate, octyl(meth)acrylate, dodecyl (meth)acrylate, benzyl(meth)acrylate), substituted alkyl (meth)acrylates (e.g., glycidyl(meth)acrylate, 2-hydroxyethyl(meth)acrylate, dimethylaminoethyl (meth)acrylate, dimethylaminopropyl (meth)acrylate), alkyl(meth)acrylamides (e.g., (meth)acrylamide, dimethyl(meth)acrylamide, N-isopropyl(meth)acrylamide, n-butyl(meth)acrylamide, tert-butyl(meth)acrylamide, tert-octyl(meth)acrylamide), substituted alkyl(meth)acrylamides (e.g., dimethylaminoethyl(meth)acrylamide, dimethylaminopropyl(meth)acrylamide), polymerizing oligomers (e.g., methacryloyl-semiterminated polymethyl methacrylate).

One or more such other monomers may be used herein either singly or as combined.

The content of the repetitive unit derived from the other monomer in the alkali-soluble resin for use in the invention is preferably from 0 to 90% by mass, more preferably from 10 to 90% by mass, even more preferably from 60 to 90% by mass.

Preferably, the mass-average molecular weight of the alkali-soluble resin is within a range of from 5000 to 200000. Within the range, the alkali developability of the composition and the solvent resistance of the obtained pattern may be good. More preferably, it is within a range of from 7000 to 100000, even more preferably from 10000 to 70000.

Preferred examples (compounds JS-1 to JS-22) of the alkali-soluble resin are shown below.

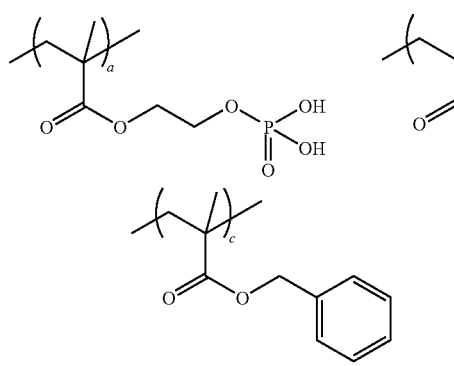

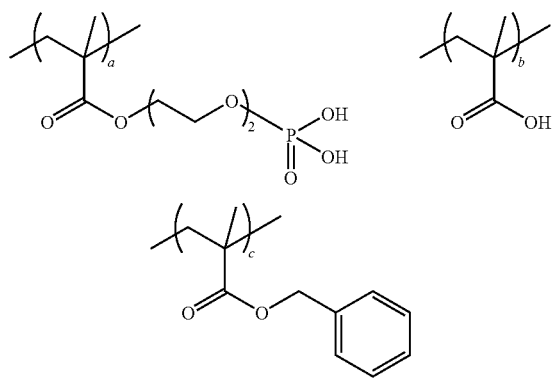

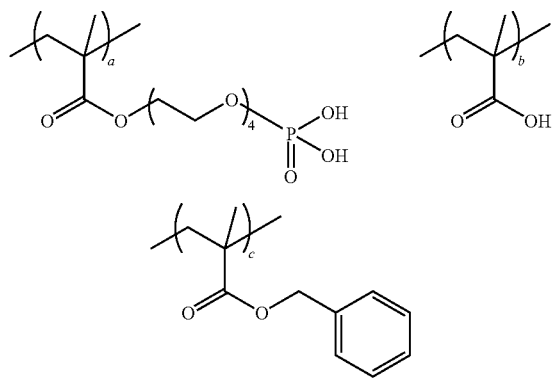

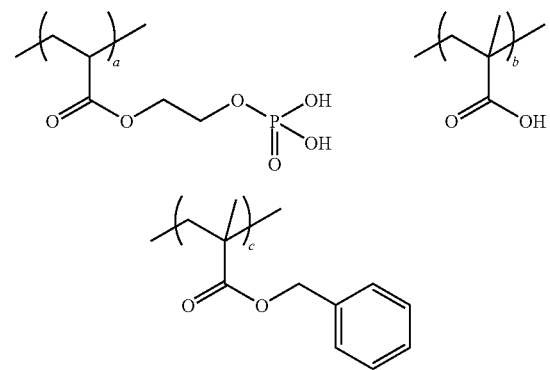

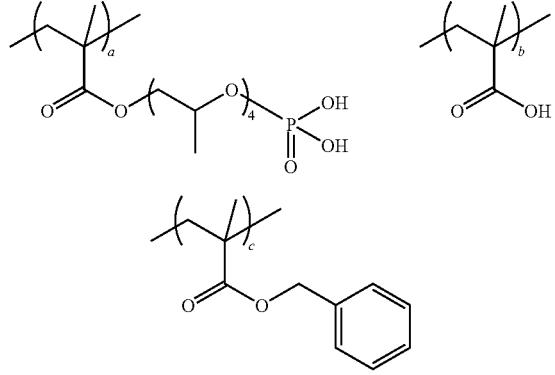

JS-6
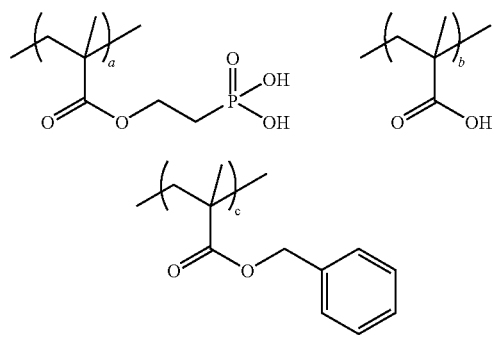
JS-7
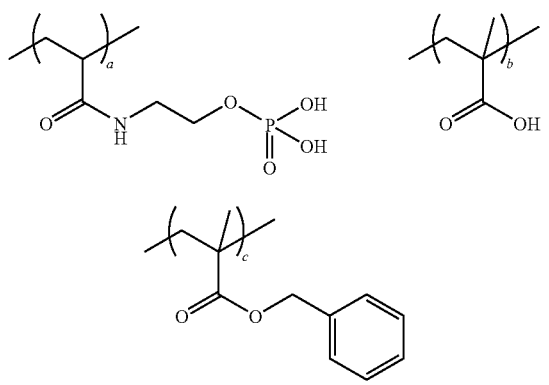
JS-8
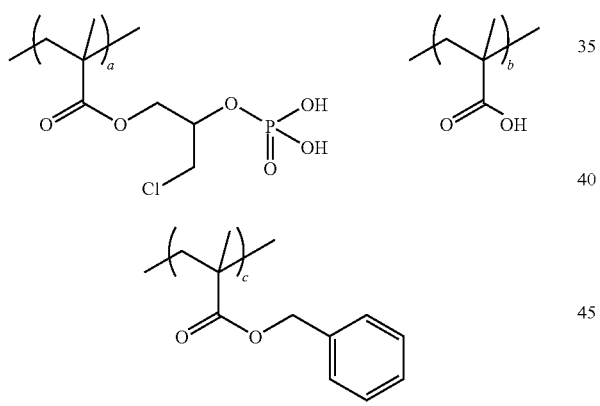
JS-9
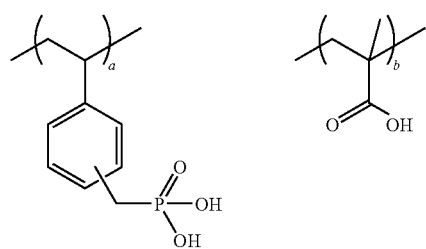
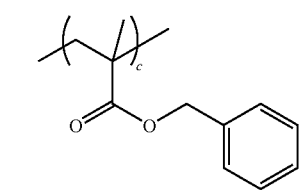
JS-10
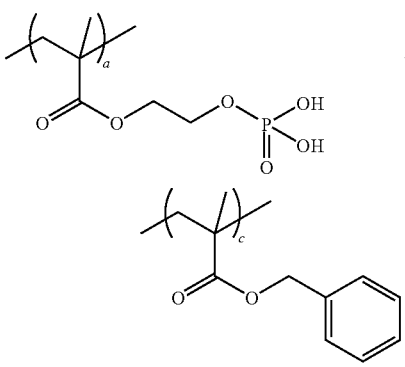
JS-11
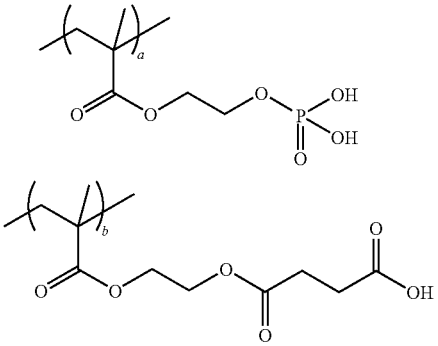
JS-12
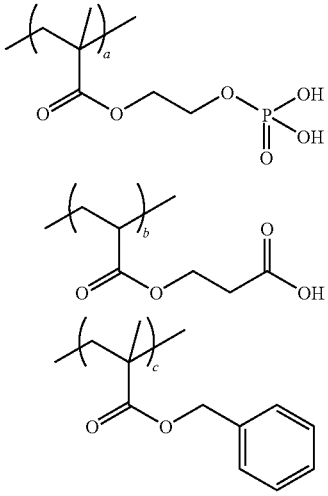
JS-13
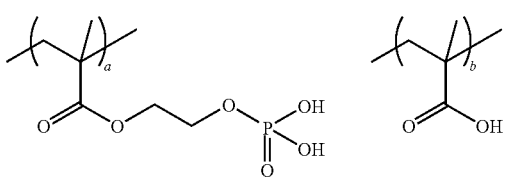

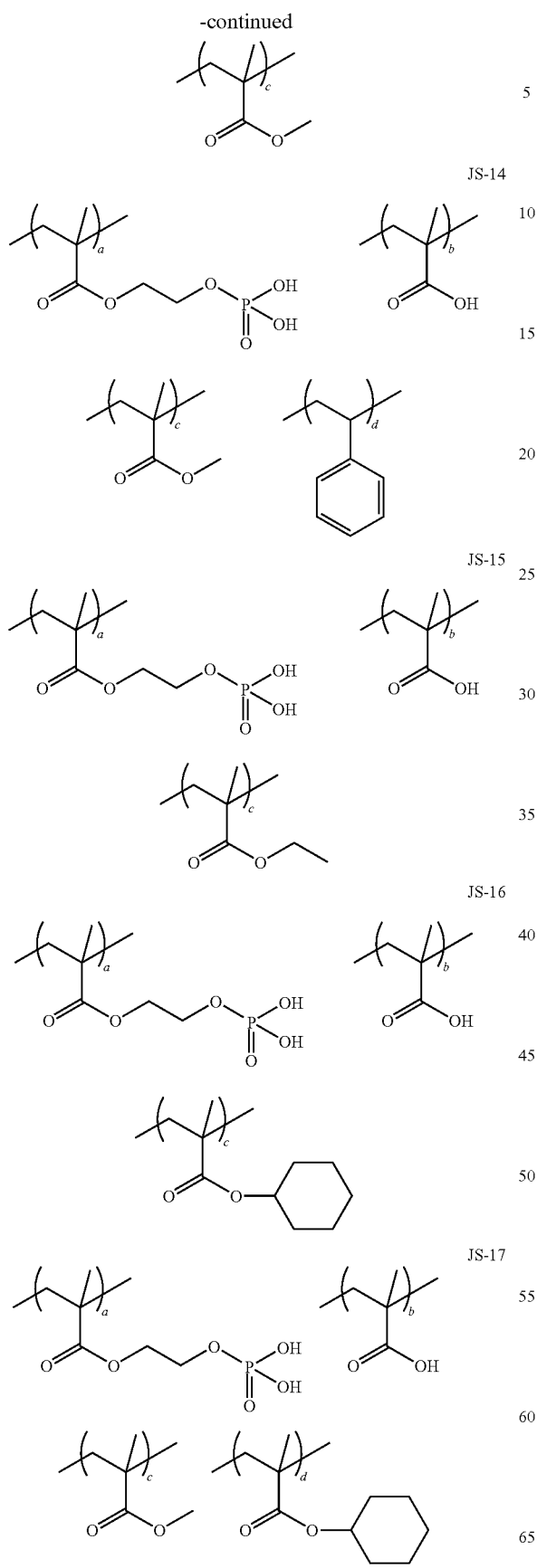
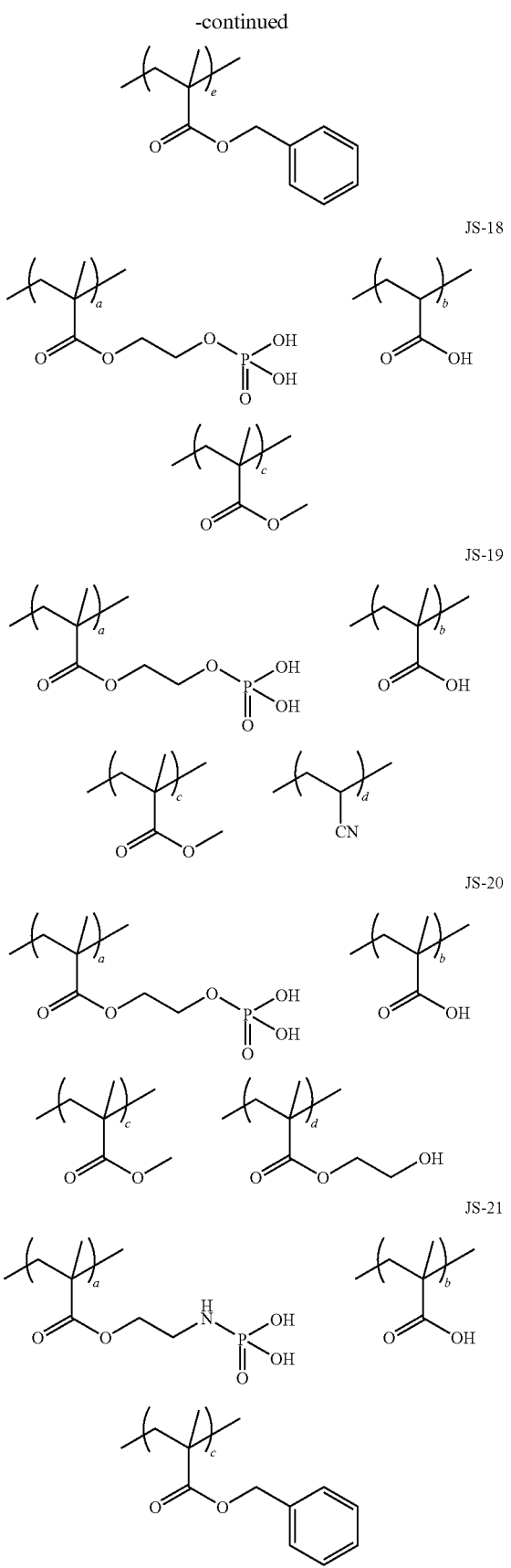

-continued

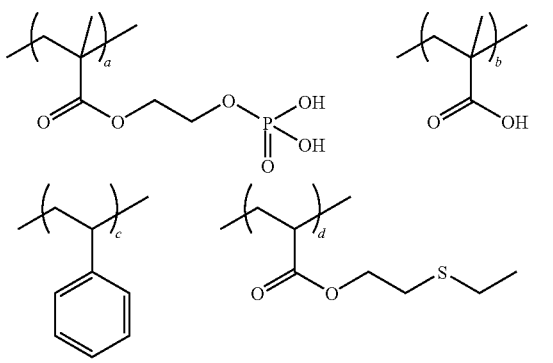

JS-22

In the above compounds JS-1 to JS-22, a to e each indicate the monomer unit content in the alkali-soluble resin, as % by mass. a indicates the content of the repetitive unit derived from a monomer of any of formulae (I) to (III). From the viewpoint of the balance between improving the adhesiveness to substrate and residue reduction and for decreasing chipping failures, a is preferably within a range of from 0.05 to 30% by mass, more preferably from 0.1 to 20% by mass, even more preferably from 0.2 to 15% by mass.

b to e may be controlled to a desired value from the viewpoint of the acid value and the I/O value. Preferably, the resin has an acid value falling within a range of from 30 to 400 mg-KOH/g.

Of the above JS-1 to JS-22, compounds having a preferred copolymerization ratio for use in the invention are shown in the following Table 1.

TABLE 1

|  | a | b | c | d | e | Compound Name |
|---|---|---|---|---|---|---|
| JS-1 | 1 | 14 | 85 | — | — | Compound S-1 |
| JS-2 | 1 | 14 | 85 | — | — | Compound S-2 |
| JS-3 | 1 | 14 | 85 | — | — | Compound S-3 |
| JS-4 | 1 | 14 | 85 | — | — | Compound S-4 |
| JS-5 | 1 | 14 | 85 | — | — | Compound S-5 |
| JS-6 | 1 | 14 | 85 | — | — | Compound S-6 |
| JS-7 | 1 | 14 | 85 | — | — | Compound S-7 |
| JS-8 | 1 | 14 | 85 | — | — | Compound S-8 |
| JS-9 | 1 | 14 | 85 | — | — | Compound S-9 |
| JS-10 | 1 | 14 | 85 | — | — | Compound S-10 |
| JS-11 | 1 | 14 | 85 | — | — | Compound S-11 |
| JS-12 | 1 | 14 | 85 | — | — | Compound S-12 |
| JS-13 | 1 | 14 | 85 | — | — | Compound S-13 |
| JS-14 | 1 | 14 | 40 | 45 | — | Compound S-14 |
| JS-15 | 1 | 14 | 85 | — | — | Compound S-15 |
| JS-16 | 1 | 14 | 85 | — | 44 | Compound S-16 |
| JS-17 | 1 | 13 | 30 | 12 | — | Compound S-17 |
| JS-18 | 1 | 14 | 85 | — | — | Compound S-18 |
| JS-19 | 1 | 14 | 40 | 45 | — | Compound S-19 |
| JS-20 | 1.2 | 25 | 48.8 | 25 | — | Compound S-20 |
| JS-21 | 1.2 | 14 | 84.8 | — | — | Compound S-21 |
| JS-22 | 1.5 | 25 | 48.5 | 45 | — | Compound S-22 |

The content of the resin relative to the overall solid content of the photosensitive composition is preferably from 5 to 95% by mass, more preferably from 10 to 90% by mass. When the resin content falls within the range, then the adhesiveness of the photosensitive composition layer is not excessively high and the strength and the light sensitivity of the formed layer are not worsened.

(C) Photopolymerizing Material:

The photopolymerizing material (C) is a material that polymerizes and cures through irradiation with light thereby to be insoluble in developer. In general, it contains a photopolymerization initiator and a polymerizing monomer.

Photopolymerization Initiator:

As the photopolymerization initiator, usable are known initiators described in JPA No. 2006-23696, paragraphs [0012] and [0013]. Above all, preferred is at least one photopolymerization initiator selected from a group consisting of aminoacetophenones, acylphosphine oxides and oxime esters. If desired, it may contain a photopolymerization initiation promoter.

Examples of aminoacetophenone initiators are IRGACURE (Irg) 369, IRGACURE (Irg) 379 and IRGACURE (Irg) 907 (all by Ciba Speciality Chemicals).

Examples of acylphosphine oxide initiators are DAROCUR TPO and IRGACURE (Irg) 819 (both by Ciba Speciality Chemicals).

Examples of oxime ester initiators are IRGACURE (Irg) OXE01 and CG1242 (both by Ciba Speciality Chemicals). The structures of the above initiators are shown below.

<Aminoacetophenones>

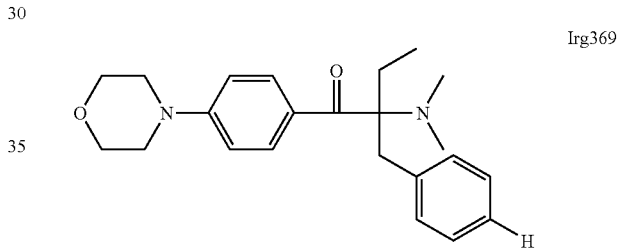

Irg369

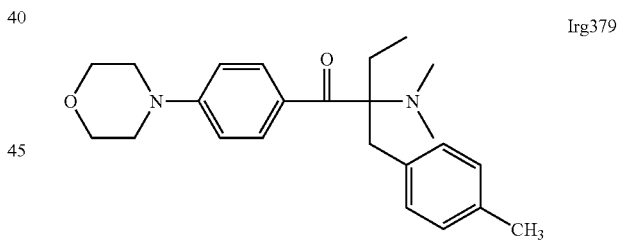

Irg379

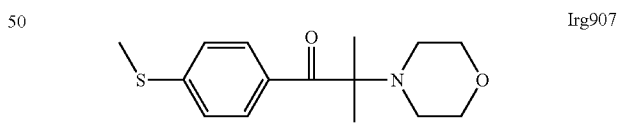

Irg907

<Acylphosphine Oxides>

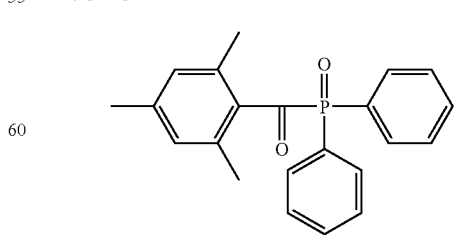

DAROCUR TPO

-continued

Irg819

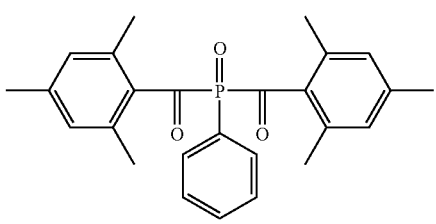

<Oxime Esters>

Irg OXE 01

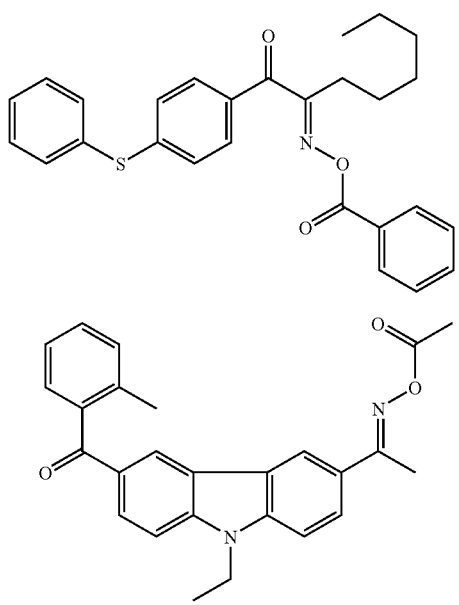

CGI242

One or more of the above photopolymerization initiators may be used herein, either singly or as combined. The content of the photopolymerization initiator relative to the overall solid content of the photosensitive composition is generally from 0.5 to 20% by mass, but preferably from 1 to 15% by mass. When the content falls within the range, the photosensitivity and the image intensity may be prevented from being lowered and the performance of the composition may be fully improved.

If desired, the photopolymerizable material (C) may contain a photopolymerization initiation promoter. The photopolymerization initiation promoter may be combined with the above photopolymerization initiator, and this is a compound that promotes the polymerization of the photopolymerizing compound initiated by the photopolymerization initiator. As the photopolymerization initiation promoter, it is desirable that the composition contains at least one amine compound.

The amine compound includes, for example, triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N,N-dimethyl-paratoluidine, 4,4'-bis(dimethylamino)benzophenone (Michler's ketone), 4,4'-bis(diethylamino)benzophenone, 4,4'-bis(ethylmethylamino)benzophenone. Of those, preferred is 4,4'-bis(diethylamino)benzophenone. Plural amines and other photopolymerization initiation promoters may be combined for use herein. The other photopolymerization initiation promoters are, for example, alkoxyanthracene compounds, thioxanthone compounds, coumarin compounds.

The alkoxyanthracene compounds are, for example, 9,10-dimethoxyanthracene, 2-ethyl-9,10-dimethoxyanthracene, 9,10-diethoxyanthracene, 2-ethyl-9,10-diethoxyanthracene.

The thioxanthone compounds are, for example, 2-isopropylthioxanthone, 4-isopropylthioxanthone, 2,4-diethylthioxanthone, 2,4-dichlorothioxanthone, 1-chloro-4-propoxythioxanthone.

The coumarin compounds are, for example, 7-[2-[4-(3-hydroxymethylpiperidino)-6-diethylamino]triazinylamino]-3-phenylcoumarin, etc.

Commercially-available photopolymerization initiation promoters may also be used, including, for example, EAB-F (Hodogaya Chemical Industry's trade name).

The amount of the photopolymerization initiation promoter to be in the photosensitive composition is preferably from 0.6 parts by mass to 10 parts by mass relative to 1 part by mass of the photopolymerization initiator therein, more preferably from 1 part by mass to 8 parts by mass, even more preferably from 1.5 parts by mass to 5 parts by mass.

Addition-Polymerizing Monomer with Ethylenic Double Bond:

The above-mentioned "addition-polymerizing monomer having an ethylenic double bond (hereinafter this may be simply referred to as "monomer")" means a monomer to be a resin insoluble in developer through addition-polymerization.

The monomer includes compounds having a boiling point at normal pressure of 100° C. or higher. For example, they are monofunctional (meth)acrylates such as polyethylene glycol mono(meth)acrylate, polypropylene glycol mono(meth)acrylate, phenoxyethyl(meth)acrylate; polyfunctional (meth)acrylates such as polyethylene glycol di(meth)acrylate, polypropylene glycol di(meth)acrylate, trimethylolethane tri(meth)acrylate, trimethylolpropane tri(meth)acrylate, trimethylolpropane di(meth)acrylate, neopentylglycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane tris(acryloyloxypropyl) ether, tris(acryloyloxyethyl)isocyanurate, tris(acryloyloxyethyl)cyanurate, glycerin tri(meth)acrylate, and those prepared by addition reaction of a polyfunctional alcohol such as trimethylolpropane or glycerin with ethylene oxide or propylene oxide followed by (meth)acrylation of the product.

Further mentioned are polyfunctional acrylates and methacrylates such as urethane acrylates as in JP-B-48-41708, 50-6034, JPA No. 51-37193, polyester acrylates as in JPA No. 48-64183, JP-B-49-43191, 52-30490, and reaction products of epoxy resin and (meth)acrylic acid, epoxy acrylates. Of those, preferred are trimethylolpropane tri(meth)acrylate, pentaerythritol tetra(meth)acrylate, dipentaerythritol hexa(meth)acrylate, dipentaerythritol penta(meth)acrylate.

One or more of the above monomers may be used herein either singly or as combined.

The content of the monomer relative to the overall solid content of the photosensitive composition is generally from 1 to 50% by mass, but preferably from 5 to 40% by mass. When the content falls within the range, the photosensitive and the image intensity do not lower and, in addition, the photosensitive composition layer is not too much sticky.

Apart from the above-mentioned (A) to (C), the photosensitive composition may further contain known additives, such as plasticizer, surfactant, thermal polymerization inhibitor, adhesiveness promoter, dispersant, dripping inhibitor, leveling agent, defoaming agent, flame retardant, glossy agent, solvent. As the other components, also usable are the other additives described in JPA No. 2006-23696, paragraphs [0016] to [0021].

The light-blocking region may be formed by preparing the above black photosensitive resin composition as a coating liquid, then applying the coating liquid onto the surface of a substrate, drying it, exposing it via a photo-mask, and thereafter removing the non-exposed part (or exposed part, depending on the type of the photosensitive composition) through development. The coating method is not specifically defined; for example, the coating liquid may be applied to a substrate, using various coaters such as spinner, whirler, roller coater, curtain coater, knife coater, wire bar coater, extruder. In addition, the above light-blocking region may also be formed according to a transfer method or an inkjet method. In the transfer method, for example, usable is a transfer material prepared by forming a black layer of the above black photosensitive resin composition, on a temporary support. In the inkjet method, usable is an ink liquid prepared by dissolving and/or dispersing the above-mentioned black colorant in a solvent optionally along with a photopolymerizable material, a binder and a surfactant.

In case where the optical filter of the invention is produced as a color filter, the light-blocking region therein acts as a black matrix that partitions RGB color regions from each other. The light-blocking region may function as an electrode. The light-blocking region that functions as an electrode may be a metal film formed through vapor deposition.

For producing a color filter, which is one embodiment of the invention, the light-transmitting region is colored in R, G and B. The RGB light-transmitting regions may be formed, for example, using R-color, G-color and B-color photosensitive resin compositions, like the above-mentioned light-blocking region. These color photosensitive resin compositions may be prepared in the same manner as that for the above-mentioned black photosensitive resin composition, for which, however, the black colorant (A) is changed to the respective R, G and B colorants. Examples of the colorants are particles of polymer organic materials such as organic pigment, organic dye, fullerene, polydiacetylene, polyimide, as well as aromatic hydrocarbons or aliphatic hydrocarbons (e.g., alignable aromatic hydrocarbons or aliphatic hydrocarbons, or sublimable aromatic hydrocarbons or aliphatic hydrocarbons). Above all, organic nanoparticles are preferred for the colorants. Colored organic nanoparticles may be produced, for example, by mixing an organic material solution prepared by dissolving an organic material of a colorant in a good solvent, and a solvent that is miscible with the good solvent but is a poor solvent for the organic material, for precipitation of colorant nanoparticles.

The color light-transmitting region may be formed according to a transfer method or an inkjet method, like the above-mentioned light-blocking region, in which the materials to be used may be the same as those to be used in forming the light-blocking region. Briefly, the black colorant in forming the light-blocking region is changed to the respective colorants.

The present invention has many applications of color filters, lenses for astronomical observation, etc. In particular, the optical filter of the invention may prevent light diffraction when polarized light comes therein, and therefore it is suitable to applications with polarizers, for example, applications of color filters for use in liquid-crystal display devices.

[Liquid Crystal Display Device]

The invention also relates to a liquid crystal display device comprising, at least, a liquid crystal display cell, a polarizer and an optical film of the invention. The invention is applicable to any liquid crystal display devices employing various modes. Examples of the mode are described in various publications such as "General Technologies of Reflection Mode Color LCD" under the supervision of Tatsuo Uchida (published by CMC in 1999); "New Developments of Flat Panel Displays" (published by Search Division of Toray Research Center Inc. in 1996); and "Present Situation and Future Prospects of Markets Relating to Liquid Crystal (First and Last Numbers)" (published by Fuji Chimera Research Institute. Inc. in 2003).

One embodiment of the invention is a VA-mode liquid crystal display device. This embodiment will be described hereinafter.

(VA-mode Liquid Crystal Display Device)

Figure 5:
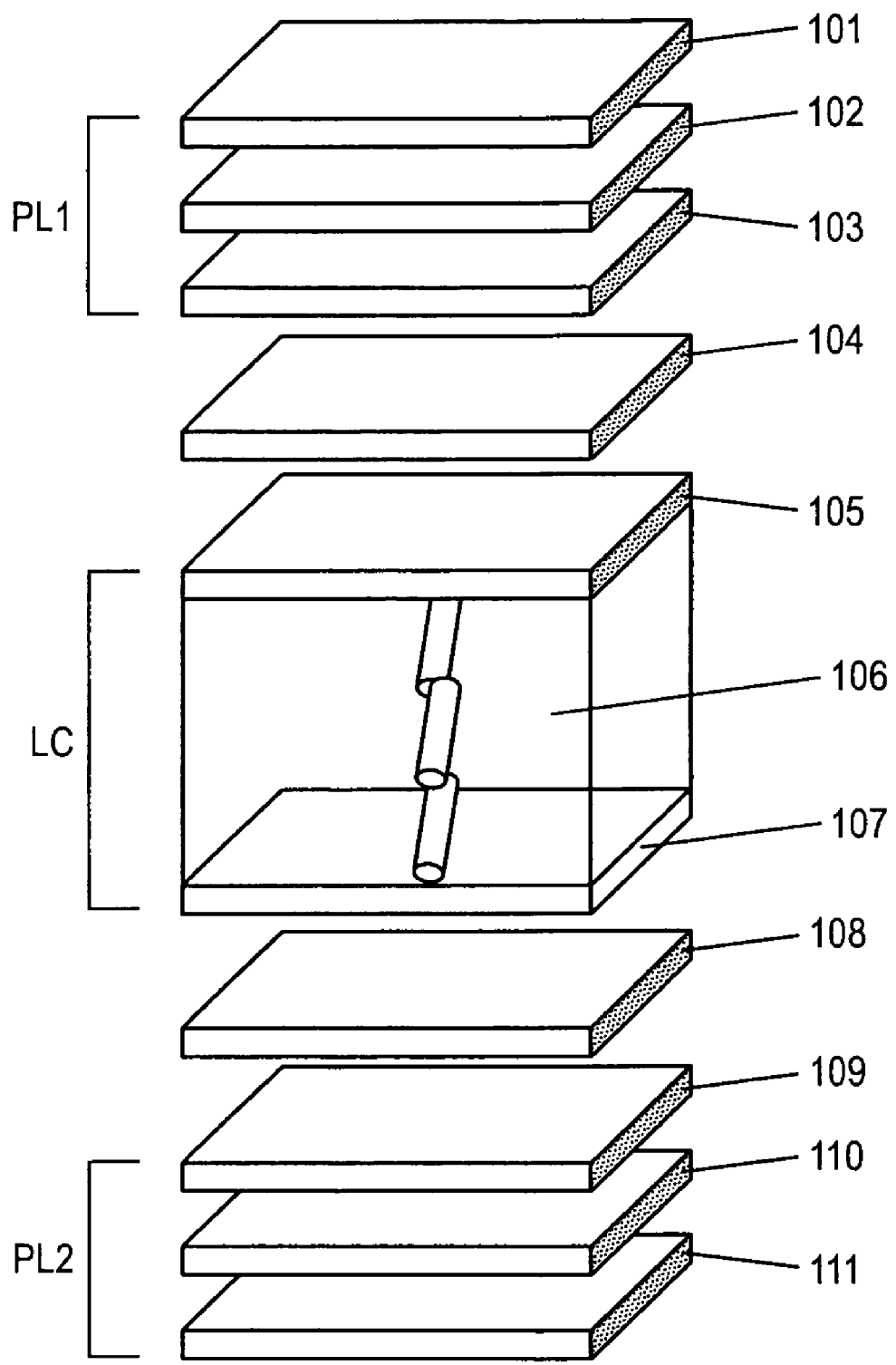
FIG. 5 is a view showing a frame format of a constitutional example of a VA-mode liquid crystal display device.

The liquid crystal display device shown in FIG. 5 comprises polarizing plates PL1 and PL2, and a liquid crystal display cell LC (comprising the members 105 to 107) therebetween. The upper polarizing plate PL1 has a polarizer 102 and protective films 101 and 103 on the surfaces of the polarizer 102; and the lower polarizing plate has a polarizer 110 and protective films 109 and 111 on the surfaces of the polarizer 110. Optically anisotropic layers 104 and 108 each are disposed between the upper polarizing plate PL1 and the liquid crystal display cell LC and the lower polarizing plate PL2 and the liquid crystal display cell LC. The optically anisotropic layer may be a birefringence polymer film or a layer prepared by curing an alignment state of a liquid crystal composition. Using a birefringence polymer film as the optically anisotropic layer 104 or 108 may allow the protective film 103 or 109 to be removed from the device.

The liquid crystal display cell LC comprises upper and lower conductive substrates 105 and 107 and a liquid crystal layer 106 therebetween. The liquid crystal layer 106 contains liquid crystal material of which dielectric anisotropy is negative, $\Delta n$ is 0.0813 around, $\Delta \in$ is −4.6 around, an example is "MLC-6608" produced by Merck, and is aligned almost homeotropically (for example 890 around). The product of its thickness d and its birefringence $\Delta n$, "$\Delta nd$", is preferably from 0.2 to 0.5 µm around, and more preferably from 0.25 to 0.35 µm around. The value of $\Delta nd$ may be adjusted to the preferred range by controlling the thickness (gap) of the liquid crystal layer 106, and the gap may be adjusted to a preferred range by using any spacer such as polymer beads, glass beads, glass fibers and column-like resin spacers. The liquid crystal display cell LC has an RGB color filter (not shown in FIG. 5), which is the optical filter of the invention, on a surface of either the conductive substrate 105 or 107.

The absorption axes of the upper polarizer 102 and the lower polarizer 110 are about perpendicular to each other. In the undriven state, applied no drive voltage to the conductive substrates 105 and 107, liquid crystal molecules in the layer 106 are aligned almost vertically with respect to the substrate surface, and the polarizing state of light going through the liquid crystal display cell is hardly changed. That is, the liquid crystal display device shown in FIG. 5 achieves the black state in the undriven state. On the other hand, in the driven state, liquid crystal molecules in the layer 106 are inclined to the substrate surface and aligned almost horizontally with respect to the substrate surface, and the polarizing state of light going through the liquid crystal display cell is changed by birefringence of inclined liquid crystal molecules. That is, the liquid crystal display device shown in FIG. 5 achieves the white state in the driven state.

One feature of a VA-mode resides in its quick response and high contrast. Although its contrast is high in the normal direction relative to the displaying plane, it is low in the oblique directions. As described above, in the black state, liquid crystal molecules in the layer are aligned almost vertically to the substrate surface. Viewed in the normal direction, the liquid crystal layer in such an alignment state shows little birefringence, and can achieve high contrast because of its low transmittance. On the other hand, viewed in any oblique direction, the liquid crystal layer in such an alignment state shows birefringence. Further more, although, viewed in the normal direction, absorption axes of the upper and lower polarizers are perpendicular to each other, viewed in the oblique direction, they are out of the perpendicular alignment (90° alignment). Light leakage in the black state and lowering contrast is caused by these two factors. The optically anisotropic layers 104 and 108 contribute to reducing such light leakage.

Further more, light leakage is caused in the black state by the diffraction phenomenon occurred in the boundary between the light-transmitting and light-blocking regions. The liquid crystal display device shown in FIG. 5 has the optical filter of the invention as a color filter, and light leakage due to the diffraction phenomenon of the color filter is also reduced. As a result, it may achieve higher contrast compared with a conventional VA-mode liquid crystal display device.

In the white state, there is difference in degree of birefringence of the liquid crystal molecules between being viewed in the direction along with they are inclined or in the opposite direction thereof, and therefore, there may be differences in brightness and color tone. In order to reduce the differences, a multi-domain structure, in which a pixel is divided into multiple domains, is preferably employed.

Although the liquid crystal display device shown in FIG. 5 is an embodiment employing liquid crystal material of which dielectric anisotropy is negative, the effect of the invention is also obtainable in any embodiments employing liquid crystal material of which dielectric anisotropy is positive. According to the embodiment, an electrode is formed on a surface either the upper or the lower substrate, and an electric field is applied to the layer in a transverse direction which is parallel to the substrate surface.

Generally, chiral material, which is generally employed in a TN-mode LCD, is not often employed in a VA-mode LCD since it may lower dynamic responsiveness, however it may be employed in order to reduce defects in the alignment.

[TN-Mode Liquid Crystal Display Device]

An embodiment of the liquid crystal display device of the invention is a TN-mode liquid crystal display device.

A TN-mode has been employed most extensively, and is described in a lot of publications. In a TN-mode liquid crystal display cell of the black state, some rod-like liquid crystal molecules are aligned almost vertically in the central portion, and other are aligned almost horizontally in the portions close to the substrates. The liquid crystal display device of this embodiment comprises a TN-mode liquid crystal display cell and a color filter, which is the optical filter of the invention, on the inner surface of either the upper or lower substrate.

[IPS-Mode Liquid Crystal Display Device]

An embodiment of the liquid crystal display device of the invention is an IPS-mode liquid crystal display device.

According to an IPS mode liquid crystal display cell, liquid crystal molecules are aligned horizontally with respect to the substrate surface in any states and their alignments are switched by in-plane rotations. Under no electric field, liquid crystal molecules are aligned with a small angle with respect to the long direction of the electrode. Under an electric field, in the driven state, liquid crystal molecules are aligned in a direction parallel to that of the electric field. It is possible to vary the transmittance by disposing a pair of polarizers between which an IPS-mode liquid crystal display cell is disposed. Nematic liquid crystal of which dielectric anisotropy $\Delta \in$ is positive may be employed. The value of $\Delta n$ of the IPS mode liquid crystal display cell may be adjusted to the range from 0.25 µm to 0.32 µm.

The liquid crystal display device of this embodiment comprises an IPS-mode liquid crystal display cell and a color filter, which is the optical filter of the invention, on the inner surface of either the upper or lower substrate.

[Other Liquid Crystal Display Devices]

The effect of the invention is obtainable in any embodiments employing other modes such as STN and ECB modes.

EXAMPLES

The invention is described more concretely with reference to the following Examples, in which the material and the reagent used, their amount and the ratio, the details of the treatment and the treatment process may be suitably modified or changed not overstepping the sprit and the scope of the invention. Accordingly, the invention should not be limited by the Examples mentioned below.

<Production and Evaluation of Liquid Crystal Display Device>

Production of Color Filter (CF)—

Preparation of Halftone Photo-Mask

Figure 6:
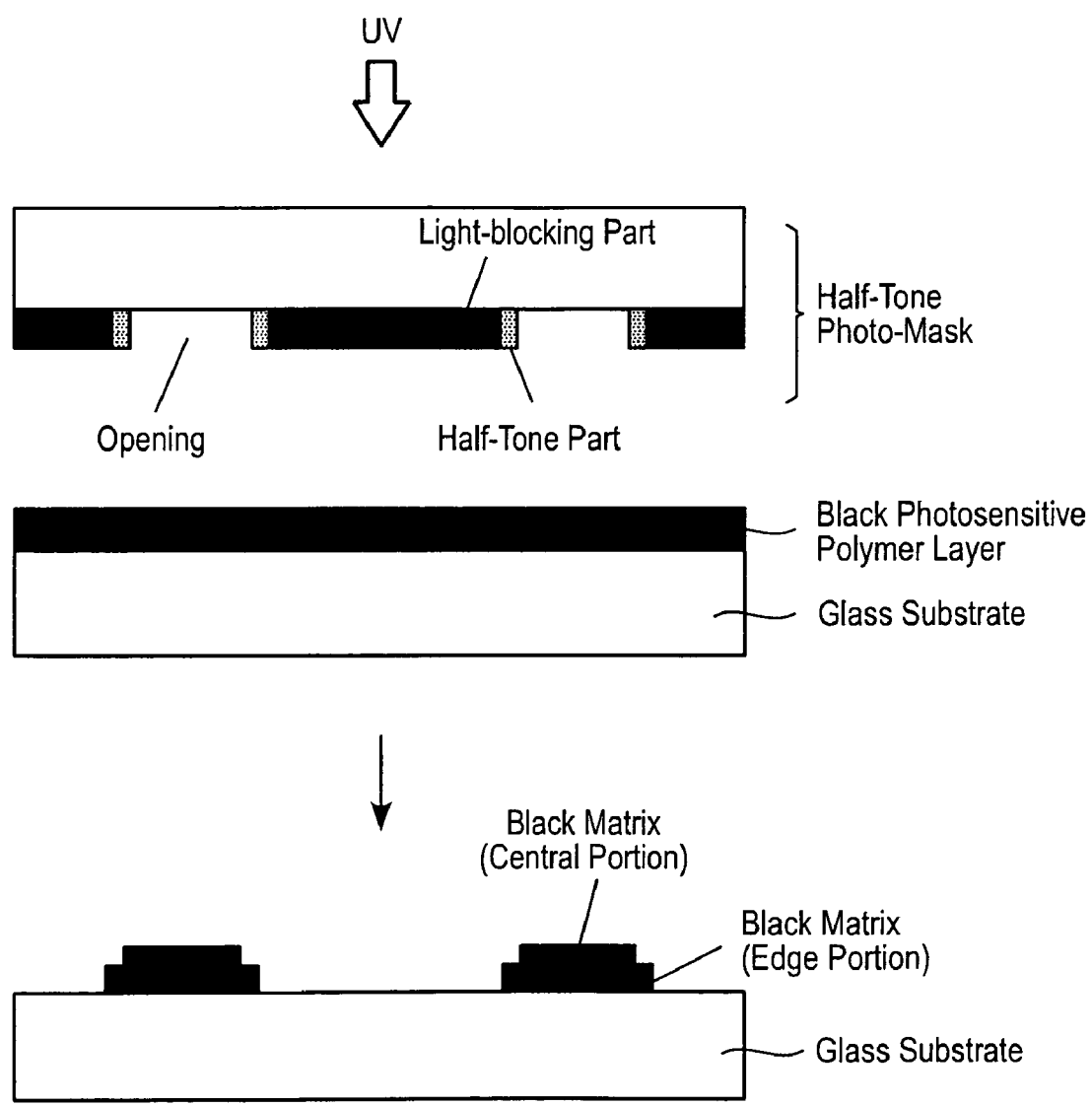
FIG. 6 is a view showing a frame format of a part of a process for preparing a color filter substrate according to Example.

A halftone photo-mask shown in FIG. 6, having light-blocking parts corresponding to the patterns of the colored layers, light-transmitting openings corresponding to the central parts of the black matrix, and halftone parts corresponding to the edge parts of the black matrix, was prepared. The width length of each of the openings was 30 µm, the width length of each of the light-blocking parts was 50 µm, and the width length of each of the halftone parts was 3 µm. As shown in FIG. 6, a black matrix was formed on a glass substrate by using the halftone photo-mask. In particular, the black matrix was produced as follows.

—Formation of Black (K) Image—

A non-alkali glass substrate was cleaned using an UV cleaning machine, cleaned by rotating a brush with a detergent, and then subjected to ultrasonic cleaning with ultra-purified water. The cleaned substrate was heated at 120° C. for 3 minutes to stabilize its surface state. After that, the substrate was cooled by 23° C., and then a black photosensitive polymer composition K1 was applied to the surface of the substrate with a coater, which is use for a glass substrate and has a slit-like nozzle, manufactured by Hirata Corporation, while the temperature was kept at 23° C. Subsequently, the coated layer was dried by using a VCD (vacuum drying device manufactured by TOKYO OHKA KOGYO CO., LTD for 30 seconds to remove solvent therefrom partially and make it disfluid, and then subjected to prebake at 120° C. for 3 minutes. In this way, a photosensitive polymer layer K1 having a thickness of 2.4 µm was prepared.

Pattern exposure was carried out with a proximity type exposing apparatus provided with an ultrahigh pressure mercury lamp (manufactured by Hitachi High-Technologies Corporation) in such state that the substrate and the halftone photo-mask stood vertically, while setting the distance between the exposure mask surface and the black photosensitive layer K1 to 200 µm under a nitrogen atmosphere in an exposure amount of 300 mJ/cm$^2$.

Next, pure water was sprayed with a shower nozzle to wet uniformly the surface of the black photosensitive layer K1, then shower development was effected with a KOH-based developing liquid (containing KOH, nonionic surfactant, trade name: CDK-1, manufactured by FUJIFILM ELECTRONIC MATERIALS CO., LTD.) at 23° C. for 80 seconds at a flat nozzle pressure of 0.04 MPa to give a patterned image. Therewith, ultrapure water was jetted with an ultrahigh-pressure washing nozzle at a pressure of 9.8 MPa to remove residues, and further ultrapure water was jetted with a shower nozzle to both surfaces of the substrate to remove development liquid and residues. The substrate was drained of water with an air knife, and then a black (K) image was obtained. Subsequently, it was heated at 220° C. for 30 minutes.

The light-blocking ability may be evaluated based on an optical density (OD). The OD value of the black matrix was measured by using Macbeth illuminometer "TD-904" manufactured by Kollmorgen, and it was found that the OD value of the central part was 3.8 and the OD value of the edge part was 2.7. And it was confirmed that the optical density gradation was formed.

Black matrixes having gradients shown in FIGS. 3A and 3B were formed on glass substrates respectively in the same manner as described above, except that halftone photo-masks having gradient of optical density, which were produced according to a dithering method, were used in the place of the halftone photo-mask described above.

Figure 4A:
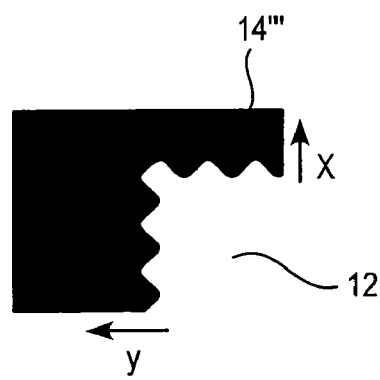
FIG. 4A is an enlarged view of apart of an example of an optical filter of the invention.
Figure 4B:
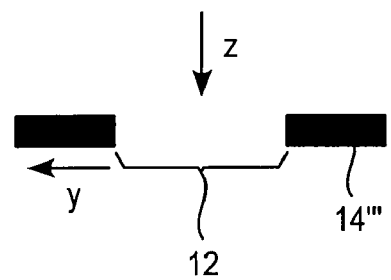
FIG. 4B to FIG. 4D each are a side view thereof.
Figure 4C:
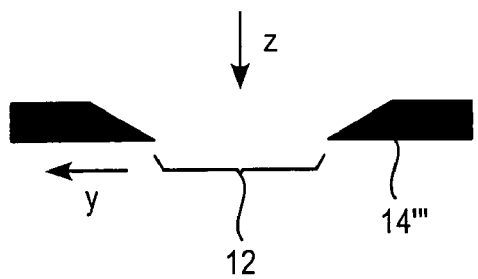
Figure 4D:
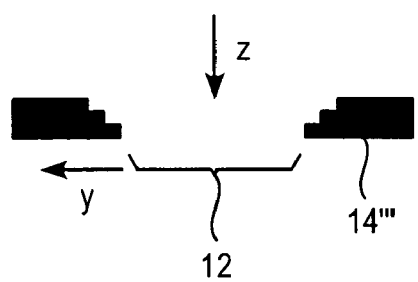

A black matrix having a waved profile shown in FIG. 4A was formed on a glass substrate in the same manner as described above, except that a photo-mask having waved-shaped slits was used in the place of the halftone photo-mask described above.

—Formation of Red (R) Image—

The substrate having K image thereon was cleaned using an UV cleaning machine, cleaned by rotating a brush with a detergent, and then subjected to ultrasonic cleaning with ultra-purified water. The substrate was heated at 120° C. for 3 minutes to stabilize its surface state. After that, the substrate was cooled by 23° C., and then a red photo-sensitive polymer composition R1 was applied to the surface of the substrate with a coater, which is use for a glass substrate and has a slit-like nozzle, manufactured by Hirata Corporation, while the temperature was kept at 23° C. Subsequently, the coated layer was dried by using a VCD (vacuum drying device manufactured by TOKYO OHKA KOGYO CO., LTD for 30 seconds to remove solvent therefrom partially and make it disfluid, and then subjected to prebake at 120° C. for 3 minutes. In this way, a photosensitive polymer layer R1 having a thickness of 1.6 μm was prepared.

Pattern exposure was carried out with a proximity type exposing apparatus provided with an ultrahigh pressure mercury lamp (manufactured by Hitachi High-Technologies Corporation) in such state that the substrate and a photo-mask (quartz exposure mask having an image pattern) stood vertically, while setting the distance between the exposure mask surface and the black photosensitive layer K1 to 200 μm under a nitrogen atmosphere in an exposure amount of 300 mJ/cm$^2$.

Next, pure water was sprayed with a shower nozzle to wet uniformly the surface of the black photosensitive layer K1, then shower development was effected with a KOH-based developing liquid (containing KOH, nonionic surfactant, trade name: CDK-1, manufactured by FUJIFILM ELECTRONIC MATERIALS CO., LTD.) at 23° C. for 80 seconds at a flat nozzle pressure of 0.04 MPa to give a patterned image. Therewith, ultrapure water was jetted with an ultrahigh-pressure washing nozzle at a pressure of 9.8 MPa to remove residues, and further ultrapure water was jetted with a shower nozzle to both surfaces of the substrate to remove development liquid and residues. The substrate was drained of water with an air knife, and then a red (R) image was obtained. Subsequently, the substrate was heated at 220° C. for 30 minutes.

The thickness of the photo-sensitive polymer layer R1 was 1.6 μm, and the coated amounts of C.I. Pigment Red 254 and C.I. Pigment Red 177 each was 0.88 and 0.22 g/m$^2$.

—Formation of Green (G) Image—

To a surface of the substrate having K and R images thereon, a green photo-sensitive polymer composition G3 was applied and a green (G) image was formed in the same manner as the R image. The thickness of the photo-sensitive polymer layer G3 was 1.6 μm, and the coated amounts of C.I. Pigment Green 36 and C.I. Pigment Yellow 150 each was 1.12 and 0.48 g/m$^2$.

—Formation of Blue (B) Image—

To a surface of the substrate having K, R and G images thereon, a blue photo-sensitive polymer composition B3 was applied and a blue (B) image was formed in the same manner as the R image. The thickness of the photo-sensitive polymer layer B3 was 1.6 μm, and the coated amounts of C.I. Pigment Blue 15:6 and C. I. Pigment Violet 23 each was 0.63 and 0.07 g/m$^2$.

Production of LCD

On the color filter substrate produced above, a transparent electrode film (film thickness: 2000 Å) was formed by sputtering of ITO, and then spacer portions were formed on the surface of the ITO film in the regions corresponding to the black matrix (K image) in the same manner as Example 1 described in JPA No. 2006-64921. The height of each of the spacers was 3.5 μm.

A glass substrate was prepared as an opposite substrate. On the surface of the glass substrate, a transparent electrode film was formed by sputtering of ITO. To each of the surfaces of the opposite substrate and the color filter substrate, a zigzag-slit patterning was subjected for a PVA mode according to a wet-etching method. The angle of the zigzag pattern was 90 degree, the pitch of the zigzag pattern was 100 μm, the electrode width was 20 μm, and the slit width was 3 μm. And then a vertical alignment layer, polyimide layer "AL-1H659" manufactured by JSR, was formed on each of the ITO layers according to a coating method.

After that, a seal material, UV cure polymer composition, was applied onto the position corresponding to the outer frame of the black matrix provided around the pixel group of the color filter according to a dispencer method, and liquid crystal use for a PVA mode, "MLC6886" manufactured by Merck, was delivered by drops on the substrate. After that the color filter substrate was adhered with the opposite substrate, and then, the adhered substrates were subjected to a UV-treatment, after UV-irradiation, to cure the sealing material. In this way, a liquid crystal display cell was produced. To both surfaces of the liquid crystal display cell, a polarizing plate "HLC2-2518" manufactured by SANRITSU Corp. was adhered. A side-light type back light was prepared by combining a tip-type LED "FR1112H" manufactured by STANLEY ELECTRIC CO., LTD. as a red (R) LED, a tip-type LED "DG1112H" manufactured by STANLEY ELECTRIC CO., LTD. as a green (G) LED, and a tip-type LED "DB1112H" manufactured by STANLEY ELECTRIC CO., LTD. as a blue (B) LED, and the back light was disposed at the back side of the liquid crystal display cell having the polarizing plates thereon. In this way, a liquid crystal display device was produced.

[Comparative Example 1]

A color filter substrate was produced in the same manner as Example 1, except that a photo-mask without halftone parts was used in the place of the photo-mask with halftone parts. And a liquid crystal employing the color filter substrate was produced. The light-blocking ability of the black matrix was measured by using Macbeth illuminometer "TD-904" manufactured by Kollmorgen, and it was found that there was no difference in OD between the central and edge parts of the black matrix, and the OD value was 3.7.

[Evaluation]

—Measurement of Light Intensity in Black State—

Regarding each of the liquid crystal display devices produced in Example 1 and Comparative Example 1, the light intensities in the black state (that is, the state under no voltage application) and in the white state (that is, the state under being applied with a voltage of 5 V between the transparent electrodes on the color filter and opposite substrates) were measured by using a hue-brightness photometer "BM-5" manufactured by TOPCON CORPORATION. The results were shown in Table 2 below.

TABLE 2

| | Light Intensity in the white state (cd/m$^2$) | Light Intensity in the black state (cd/m$^2$) | Contrast (White/Black) |
| --- | --- | --- | --- |
| Example 1 | 107 | 0.061 | 1754 |
| Comparative Example 1 | 113 | 0.070 | 1614 |

From the results shown in the table, it is understandable that this decrease of the light intensity in the black state resulted from the decrease of the diffraction occurred in the boundary between the light-transmitting and light-blocking regions of the color filter, which is shown explicitly by the comparison between (i) and (ii) in FIG. 2.

And liquid crystal display devices employing the black-matrixes shown in FIGS. 3A, 3B and 4A were also evaluated in the same manner as described above, and it was found that the devices were improved in terms of contrast as well as the device of Example 1.

The invention claimed is:

1. An optical filter comprising a light-transmitting region of transmitting light having a predetermined wavelength and a light-blocking region disposed adjacent to the light-transmitting region to block the light, wherein the light-blocking region has an optical density gradation relative to light in the normal direction, from the contact point to the light-transmitting region along an in-plane direction, and the optical density is the smallest at the contact point to the light-transmitting region.

2. The optical filter of claim 1, wherein the optical density gradation relative to light in the normal direction increases continuously or discontinuously from the contact point to the light-transmitting region in the in-plane direction.

3. The optical filter of claim 1, wherein the optical density gradation relative to light in the normal direction is based on the gradation of the thickness of the light-blocking region.

4. The optical filter of claim 3, wherein the thickness of the light-blocking region increases continuously or discontinuously from the contact point to the light-transmitting region, in the in-plane direction.

5. The optical filter of claim 1, wherein at least a part of the contact face of the light-blocking region to the light-transmitting region has a waved profile with a pitch shorter than the wavelength of the incident light given in use.

6. The optical filter of claim 1, wherein the light-blocking region is a black matrix or an electrode.

7. The optical filter of claim 1, which is a color filter.

8. A liquid-crystal display device comprising at least a liquid crystal display cell, a polarizer and an optical filter as set forth in claim 1.

* * * * *